United States Patent [19]
Pike-Biegunski et al.

[11] Patent Number: 5,036,249
[45] Date of Patent: Jul. 30, 1991

[54] ELECTROLUMINESCENT LAMP PANEL AND METHOD OF FABRICATING SAME

[75] Inventors: Maciej J. Pike-Biegunski, Warrenville; Paul Krebaum, Lisle; Don A. Arneson, South Elgin, all of Ill.

[73] Assignee: Molex Incorporated, Lisle, Ill.

[21] Appl. No.: 448,735

[22] Filed: Dec. 11, 1989

[51] Int. Cl.$^5$ ............... H05B 33/02; G01D 11/28
[52] U.S. Cl. .................... 313/509; 313/511; 313/512; 362/23
[58] Field of Search ........ 313/509, 511, 512; 362/23

[56] References Cited
U.S. PATENT DOCUMENTS

| | | | |
|---|---|---|---|
| 3,152,994 | 10/1964 | Thornton, Jr. et al. | 313/509 X |
| 4,104,555 | 8/1978 | Fleming | 313/512 |
| 4,417,174 | 11/1983 | Kamijo et al. | 313/502 |
| 4,608,301 | 8/1986 | Ishizuka et al. | 250/483.1 X |
| 4,767,679 | 8/1988 | Kawachi | 313/512 X |
| 4,882,518 | 11/1989 | Cherry | 313/512 |

*Primary Examiner*—Sandra L. O'Shea
*Attorney, Agent, or Firm*—Louis A. Hecht; Stephen Z. Weiss; A. A. Tirva

[57] ABSTRACT

An electroluminescent lamp panel which includes transparent and base electrodes with dielectric and phosphorescent layers therebetween and an insulation layer behind the base layer. A moisture barrier layer, such as of aluminum foil, is provided on the back of the panel behind the insulation layer. The photophorescent layer includes phosphor particles having etched surfaces in an active resin having scavenging properties.

9 Claims, 3 Drawing Sheets

ELECTROLUMINESCENT LAMP PANEL AND METHOD OF FABRICATING SAME

FIELD OF THE INVENTION

This invention generally relates to luminescent displays and, particularly, to an electroluminescent lamp panel.

BACKGROUND OF THE INVENTION

Electroluminescent lamp panels are used in a wide variety of applications, including automotive displays such as speedometers or the like, marine navigation systems with numerous display dials, backlighting for computer applications and numerous other environments. Electroluminescent lamp panels often are used in membrane or touch switch panels wherein an electroluminescent lamp panel is juxtaposed with a switch panel to form a combination switch-lamp structure, such as in U.S. Pat. Nos. 4,532,395 and 4,683,360.

Basically, an electroluminescent lamp panel includes a base electrode spaced from a transparent electrode together with a dielectric layer and a phosphorescent layer between the two electrodes. Such a basic device converts electricity into light, the conversion taking place inside grains or particles of a phosphor subjected to an alternating electric field. The grains or crystals "glow" when excited by the electric field. Light exits the panel through the transparent electrode near the front of the panel.

One of the major problems with the use of electroluminescent lamp panels in such environments as automotive, marine and like applications is the penetration of moisture into the panel, particularly from the back side thereof. Such moisture penetration greatly reduces the life of the panel.

Another problem affecting the life of the panel is the life of the phosphor particles themselves. As phosphor grains age, metallic dopants, such as copper, in the phosphor migrate to the surface of the grains, causing phosphor darkening.

Still other problems in electroluminescent lamp panels revolve around various shorting propensities.

This invention is directed to a new and improved electroluminescent lamp panel which solves the above problems and which has an extended life not heretofore available.

SUMMARY OF THE INVENTION

An object, therefore, of the invention is to provide a new and improved electroluminescent lamp panel of the character described.

In the exemplary embodiment of the invention, an electroluminescent lamp panel is shown to include the basic components of a transparent and a base electrode in layered or sheet form, with dielectric and phosphorescent layers sandwiched therebetween. Usually, a front base layer and a rear insulating layer are provided, such as of polyester material.

The invention contemplates the provision of a moisture barrier layer on the back of the panel behind the insulating layer. The moisture barrier layer may be of metal material, preferably a foil such as aluminum. It has been found that this independent moisture barrier layer improves the life of the panel by preventing moisture penetration into the panel from the back side thereof.

The invention also contemplates the provision of a vastly improved phosphorescent layer which not only has an increased life of the phosphor grains themselves but provides an increased life for the composite layer by preventing phosphor darkening. More particularly, the phosphor grains themselves are etched to increase the surface area thereof. Preferably, the grains are etched with a phosphoric and acetic acid mixture which slowly relieves the grain surfaces but does not adversely affect phosphor crystal electroluminescent integrity. In addition, the etched phosphor grains are combined with an active resin having properties which scavenge for metallic ions used as dopants which have ion exchange properties; e.g., a copper ion exchanging styrene resin. Such a polymer prevents phosphor darkening by removing metallic dopants, such as copper, in the phosphor which migrate to the surface of the grains, causing the phosphor darkening. The scavenging resin removes the dopants from the surface of the grains, resulting in an increase in panel life of almost three times that heretofore available.

Lastly, the invention contemplates the use of a transparent polymeric dielectric between the conductive layer and the phosphor layer. This features improves adhesion and helps prevent shorting.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
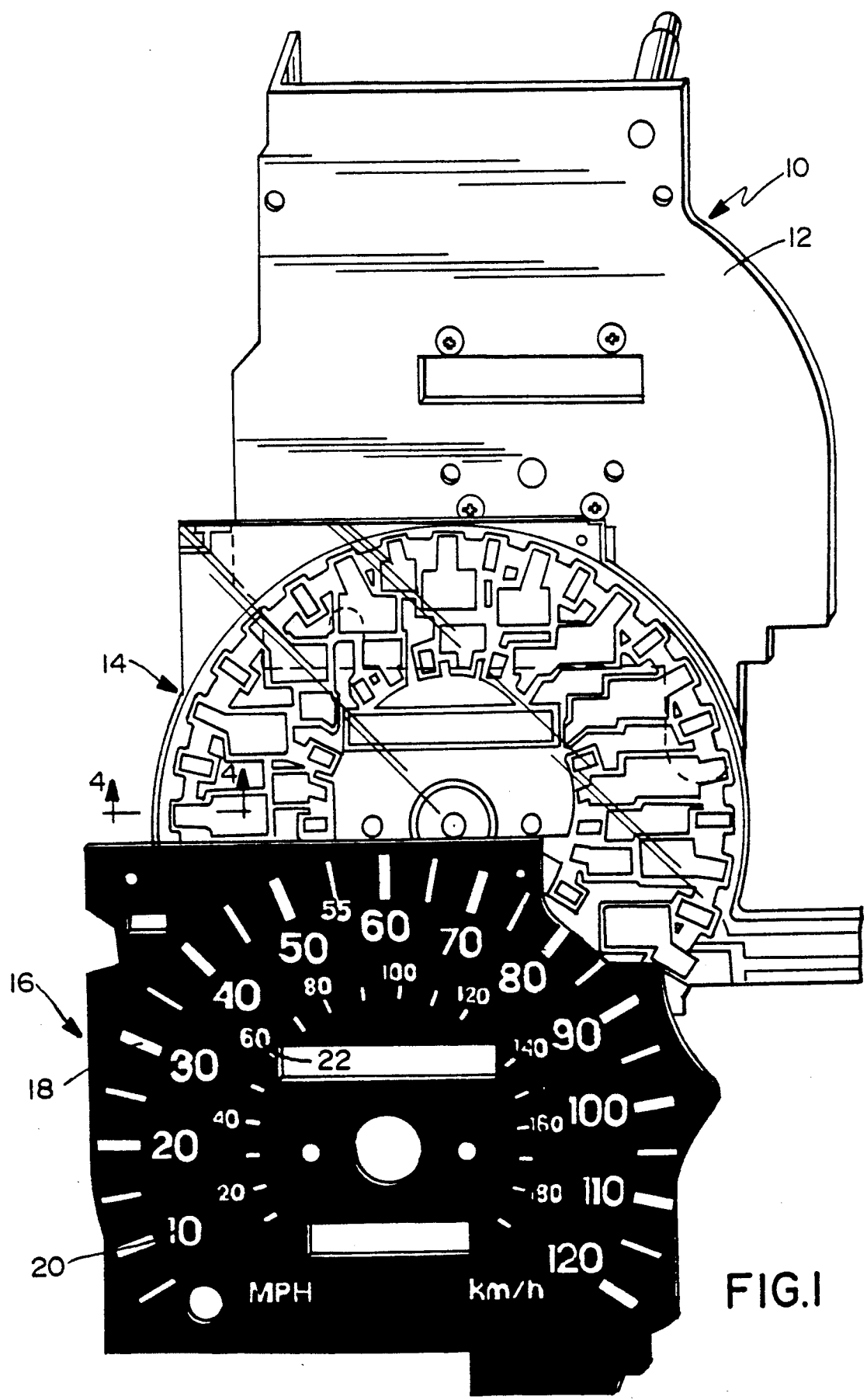
FIG. 1 is an exploded perspective view of various components of a planar automotive speedometer incorporating the electroluminescent lamp panel of the invention.

Referring to the drawings in greater detail, and first to FIG. 1, one application of the electroluminescent lamp panel of the invention is depicted. Particularly, the panel is illustrated as used in an automobile speedometer having a rigid rear frame structure, generally designated 10, including a flat or generally planar frame plate 12 to which an electroluminescent lamp panel, generally designated 14, is secured, as by appropriate adhesive. A front plate of the speedometer is shown generally at 16. The front plate is opaque except for various window configurations, such as line indicators 18, mile-per-hour numerical indicia 20 and similar kilometer-per-hour indicia 22. The windows represented by indicators or indicia 18, 20, 22 allow light emanating from electroluminescent lamp panel 14 to pass through front opaque panel 16 in selected locations only. In other words, the "glow" from the lamp panel passes through the speed-indicating windows, all of which is generally known in the art.

Figure 2:
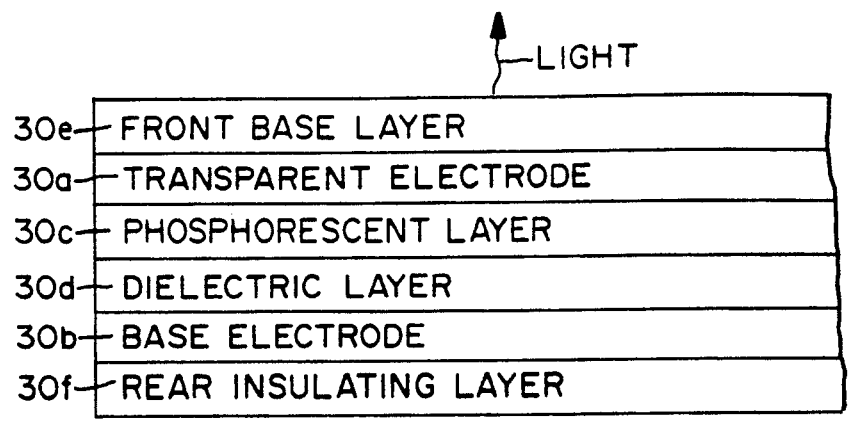
FIG. 2 is a schematic illustration of the layers comprising a prior art electroluminescent lamp panel.

FIG. 2 is a schematic illustration of the layers of a conventional electroluminescent lamp of the prior art. Basically, such a structure includes a transparent electrode layer 30a and a base electrode layer 30b, with a phosphorescent layer 30c and a dielectric layer 30d sandwiched therebetween. Base electrode 30b is a circuit formed by selective silver deposition, and phosphorescent layer 30c is a phosphor coating of a composition of an organic resin with interspersed electroluminescent crystals. Conventionally, a front base layer 30e and a rear insulating layer 30f are provided, usually of polyester material. As is known, when the grains of phosphor in phosphorescent layer 30c are subjected to an alternating electric field from base electrode 30b and transparent electrode 30a, the energy of the electric field is converted into energy of the emitted light which emanates from the phosphor particulates.

Figure 3:
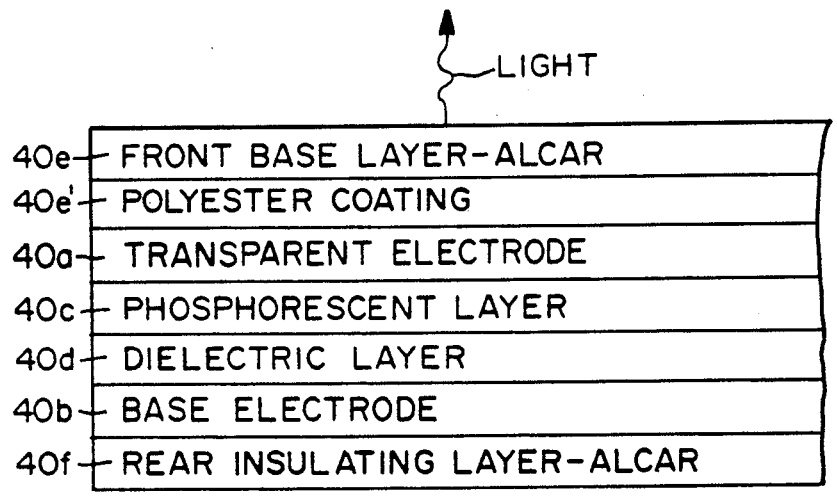
FIG. 3 is a schematic illustration of the layers of another prior art electroluminescent lamp panel.

FIG. 3 is a schematic illustration of another layered structure of the prior art, wherein, like the layered structure of FIG. 2, the electroluminescent lamp panel includes a transparent electrode 40a and a base electrode 40b, with a phosphorescent layer 40c and a dielectric layer 40d sandwiched therebetween. In this structure, the front of the panel has an Aclar base layer 40e with a polyester coating 40e'. "Aclar" is a trademark of Allied Chemical Corporation for polychlorotrifluoro ethylene. In addition, the structure of FIG. 3 includes a rear Aclar insulating layer 40f. The Aclar front and rear layers are intended as moisture barriers. However, employing such layers is a very expensive expedient for use in an electroluminescent lamp panel.

Figure 4:
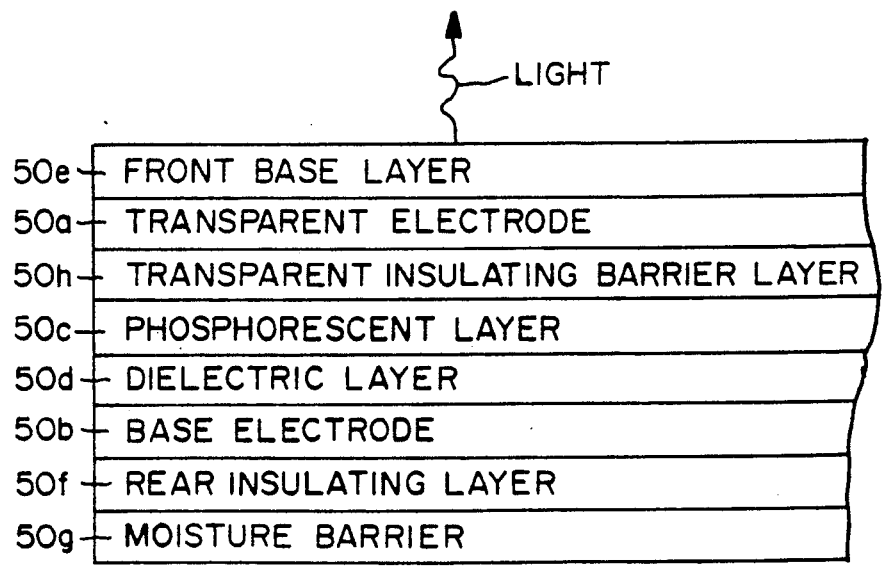
FIG. 4 is a schematic illustration of the layers of the electroluminescent lamp panel of the invention, taken generally along line 4—4 of FIG. 1.

FIG. 4 schematically illustrates the layered structure of electroluminescent panel 14 of the invention. In a general sense, this panel is similar to the prior art in that it includes a transparent electrode 50a and a base electrode 50b with a phosphorescent layer 50c and a dielectric layer 50d sandwiched therebetween, along with a front base layer 50e and a rear insulating layer 50f, the front base layer and rear insulating layers being of polyester or like material. However, the invention contemplates the addition of a separate or independent moisture barrier layer 50g on the back of the panel behind insulating layer 50f. This moisture barrier layer preferably is of very inexpensive material such as of aluminum foil. Such a layer is very efficient in preventing moisture from migrating or penetrating into the layered panel structure from the rear thereof.

As will be described in greater detail hereinafter, a transparent insulating barrier layer 50h also is provided between transparent electrode 50a and phosphorescent layer 50c, such as of a polymeric dielectric coating.

Figure 5:
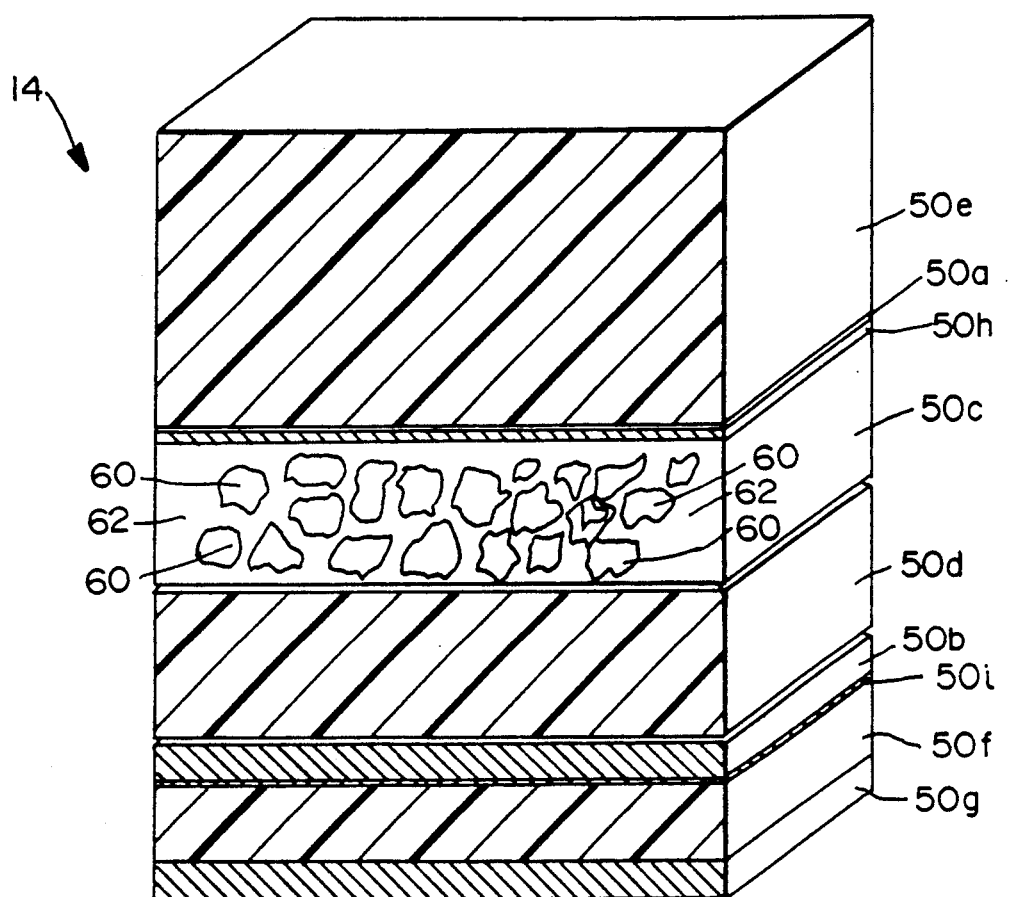
FIG. 5 is a perspective view of a section out of the electroluminescent lamp panel of the invention to better illustrate the various layers thereof.

FIG. 5 shows an enlarged section through electroluminescent lamp panel 14 according to the invention, incorporating the sequence of layers as described in relation to FIG. 4 with corresponding referenced numerals. The only difference is that an adhesive coating 50i is shown between base electrode 50b and rear insulating layer 50f.

FIG. 5 shows on a very enlarged scale that phosphorescent layer 50c actually includes phosphor particles or grains 60 interspersed in a resin 62. This composition, as is known, is layered in coating form and actually is like a luminescent "ink" of resin and phosphor grains. The phosphor grains themselves have an inherent active life. A larger grain with a larger surface area will have a longer life than a smaller grain with a smaller surface area. The invention contemplates an improved phosphor coating wherein grains 60 first are etched to increase their surface areas and, thereby, increase their life. This must be done slowly so as not to attack the phosphor crystals. Deterioration or breaking down of the crystals would reduce illuminescence. Therefore, the phosphor grains are etched slowly in a mild phosphoric and acetic acid mixture before the grains are mixed with resin 62. This etching process makes the surfaces of the grains irregular (as exaggerated in FIG. 5) to increase the surface area of each individual grain. As stated, this increases the life of the phosphor particles, with the improved scavenging action of the ion exchange resin (binder) described below.

Another problem with phosphorescent layers or coatings is that as phosphor grains age, metallic dopants, such as copper, in the phosphor migrate to the surface of the grains, causing phosphor darkening and, thereby, requiring replacement of the electroluminescent lamp panel. Specifically, when dopants such as copper migrate to the surface of the grains they undergo oxidation resulting in copper oxide and copper sulfide darkening the exterior surfaces of the grains. The invention contemplates using an active resin 62 in the phosphorescent layer 50c which is a polymer of a type of scavenging or ion exchange resin which prevents phosphor darkening. The scavenging resin removes the oxidized dopants from the surface of the grains and increases the life of the panel as much as three times that heretofore experienced. The particular resin contemplated is from the chemical group of styrene resins and acts as an active resin, having ion exchange properties to remove dopants such as copper from the surface of the phosphor grains, thereby improving the transparency and life of the composite panel. In other words, heretofore, phosphorescent layers in electroluminescent lamp panels used inactive resins which simply acted as a matrix or a binder for the phosphor particles.

As stated above, the electroluminescent lamp panel 14 of the invention also incorporates a transparent insulating barrier layer 50h between transparent electrode 50a and phosphorescent layer 50c. This insulating barrier layer may be a polymeric dielectric coating. The layer improves adhesion in the composite laminate structure and helps prevent shorting.

Figure 6:
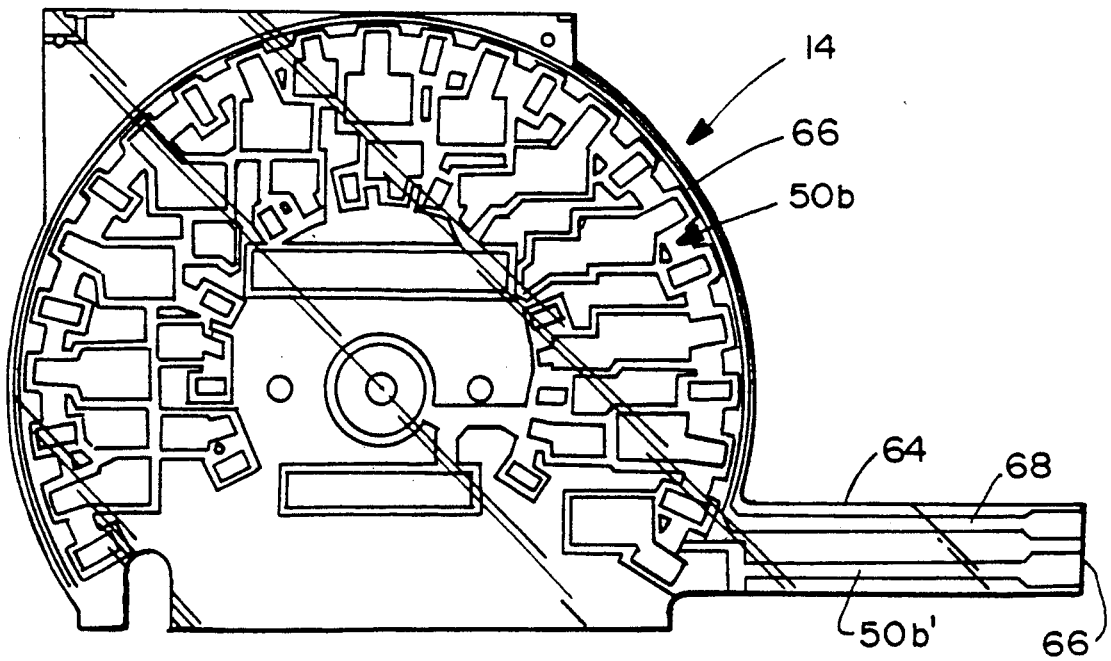
FIG. 6 is a plan view of the electroluminescent lamp panel, showing the configuration of the base electrode.

Lastly, FIG. 6 shows the configuration of base electrode 50b which is a selective silver deposition-type circuit having a lead 50b' extending along a leg portion 64 of the panel to a distal edge 66 of the leg for connection to an appropriate source of electrical current. A substantially semi-circular bus bar 66 surrounds electrode 50b and has its own lead 68 extending along leg 64. The invention contemplates that this bus bar be printed simultaneously with electrode 50b to eliminate an independent printing step. Heretofore, prior art panels were fabricated by screen printing the bus bar in the laminate structure in a separate step.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An electroluminescent lamp panel, comprising:
a front base layer of polyester material;
a transparent electrode behind the front base layer;
a transparent insulating barrier layer behind the transparent electrode;
a phosphorescent layer behind the transparent insulating barrier layer and including phosphor particles having etched surfaces to increase the surface area thereof, the phosphor particles being interspersed in an active resin having scavenging properties;
a dielectric layer behind the phosphorescent layer;
a base electrode behind the dielectric layers;
an insulation layer of polyester material behind the base electrode; and a moisture barrier layer on the back of the panel behind the insulation layer.

2. The electroluminescent lamp panel of claim 1 wherein said moisture barrier layer is of aluminum foil material.

3. The electroluminescent lamp panel of claim 1 wherein said insulating barrier layer comprises a polymeric dielectric coating.

4. The electroluminescent lamp panel of claim 1 wherein said resin is a synthetic polymer resin.

5. The electroluminescent lamp panel of claim 4 wherein said resin is an ion exchanging styrene resin.

6. The electroluminescent lamp panel of claim 1 wherein said base electrode is printed in the panel simultaneously with a bus bar for the transparent electrode.

7. The electroluminescent panel of claim 1, wherein said phosphor particles are etched in an acid solution.

8. The electroluminescent panel of claim 7, wherein said acid solution is an acetic acid solution.

9. An illuminated automotive instrument display comprising:
a rigid rear frame structure including a generally planar frame plate,
an electroluminescent lamp panel secured to said plate, the panel comprising:
a front base layer of polyester material,
a transparent electrode behind the front base layer,
a transparent insulating barrier of polymeric dielectric coating behind the transparent electrode,
a phosphorescent layer behind the transparent insulating barrier and including phosphor particles having etched surfaces to increase the surface area thereof, the phosphor particles being interspersed in an active resign having scavenging properties,
a dielectric layer behind the phosphorescent layer,
a base electrode behind the dielectric layer,
an insulation layer of polyester material behind the base electrode, and
a moisture barrier layer of aluminum foil material behind the insulation layer, and
a generally opaque plate having translucent windows at predetermined locations positioned in front of said lamp panel.

* * * * *